Patented Jan. 20, 1948

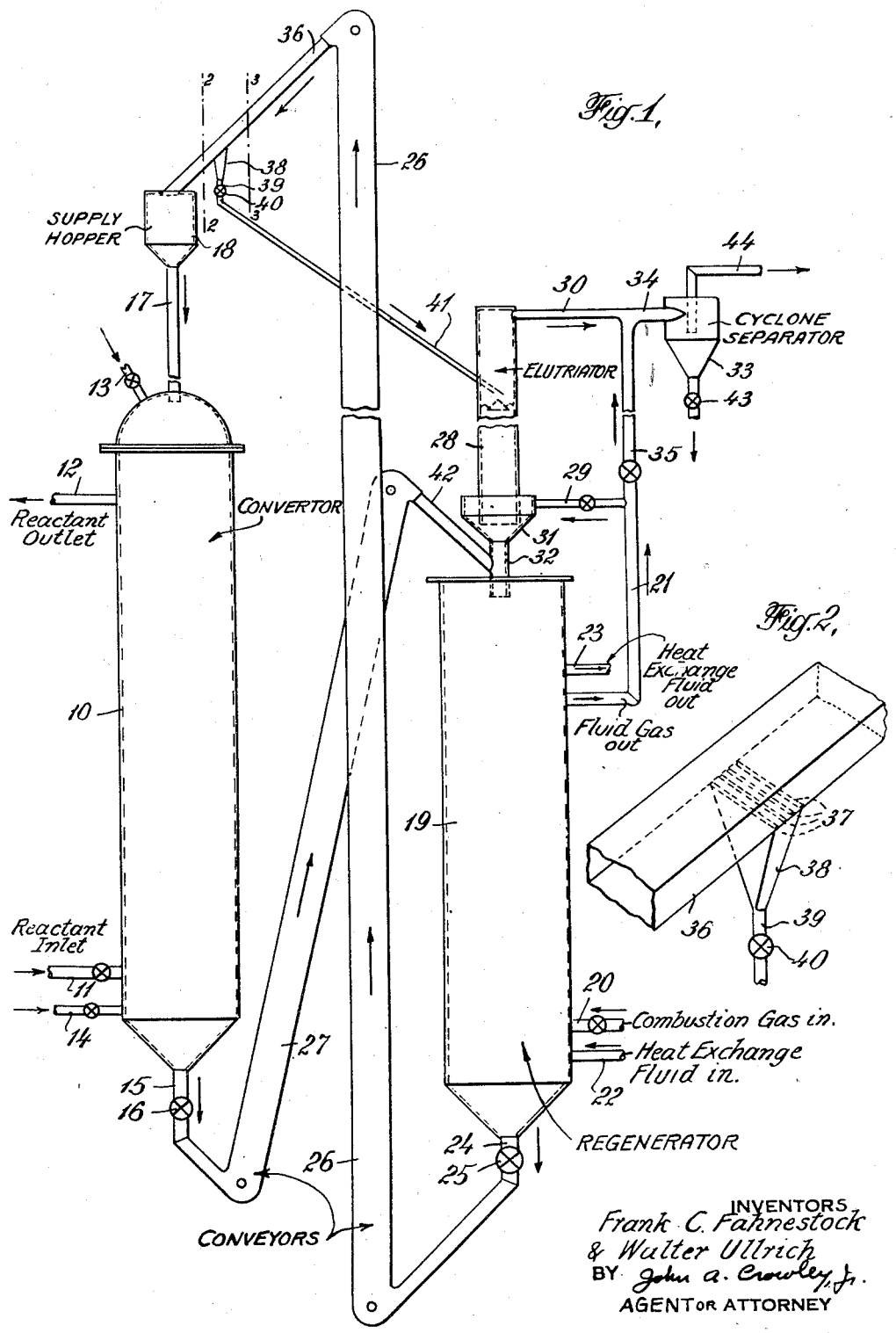

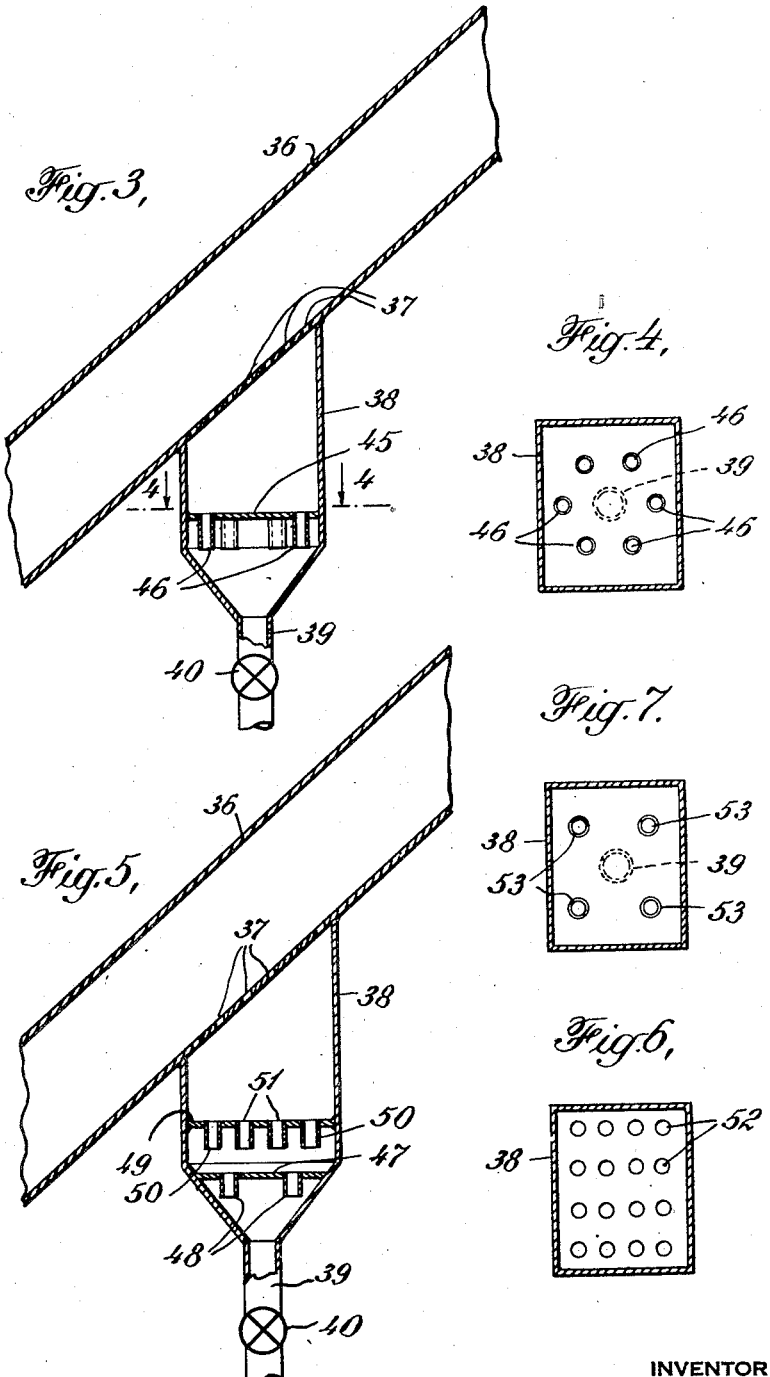

2,434,843

UNITED STATES PATENT OFFICE 2,434,843

METHOD FOR HYDROCARBON CONVERSION IN PRESENCE OF PARTICLE FORM CATALYSTS

Frank C. Fahnestock, Manhasset, and Walter Ullrich, Pleasantville, N. Y., assignors of one-half to Socony-Vacuum Oil Company, Incorporated, a corporation of New York, and one-half to The Lummus Company, a corporation of Delaware Application January 29, 1946, Serial No. 644,130

9 Claims. (Cl. 196—52)

1

This invention pertains to an improved method for conducting catalytic hydrocarbon conversion processes. Exemplary of such processes are the catalytic reforming of naphtha and gasoline, catalytic hydrogenation, dehydrogenation, isoforming, alkylation, desulphurization, aromatization, and cracking of hydrocarbon fractions. Typical of such processes is the catalytic cracking conversion of hydrocarbons, it being well known, for example, that gas oils boiling within the range of about 450° F. to 750° F. upon being contacted with certain adsorbent materials at temperatures of the order of 800° F. and higher and usually at superatmospheric pressures may be converted to lower boiling hydrocarbons containing large amounts of gasoline. The catalytic materials involved in such processes may take the form of natural or treated clays, bauxites, alumina and certain synthetic associations of silica, alumina, or silica and alumina to which small percentages of other materials may be added such as certain metallic oxides. The catalysts may vary in particle size depending upon the type of process involved. For processes wherein the catalyst moves through the conversion zone as a substantially compact column of particles, the catalyst particles may range in normal size from about 4 to 60 mesh and preferably from about 4 to 8 mesh by Standard Tyler screen analysis.

This invention is particularly concerned with an improvement in that type of catalytic conversion process wherein a particle form catalyst is passed cyclically through a conversion zone wherein it moves as a substantially compact column and is contacted at elevated temperature with gaseous hydrocarbons to effect the conversion thereof and through a regeneration zone wherein it moves as a substantially compact column and is contacted with a combustion supporting gas acting to burn off of the catalyst carbonaceous contaminants deposited thereon during the hydrocarbon conversion.

In such cyclic processes catalyst fines gradually accumulate in the cyclically moving stream of catalyst due to gradual attrition of the particles falling within a predetermined normal size range. Such fines interfere with the proper operation of the conversion and regeneration apparatus and seriously reduce the capacity thereof. For this reason the percentage of fines in the cyclically moving stream of catalyst should be maintained very low, for example, of the order of 1.0 to 5.0 per cent by weight. Since the fines formed from attrition become substantially uniformly distributed in the moving stream of catalyst, and

2 since the total amount of catalyst circulation is very high and the percentage of fines therein very low, the continuous removal of fines from the cyclically moving stream of catalyst is a costly and difficult process.

A major object of this invention is the provision in a catalytic conversion process wherein a stream of catalyst passes cyclically through a hydrocarbon conversion zone and a regeneration zone of an improved method for removal of fines formed by attrition from the cyclically moving stream of catalyst. A specific object of this invention is the provision in a continuous cyclic catalytic hydrocarbon conversion process of a method permitting proper limitation of the accumulation of fines in the cyclically moving stream of catalyst by separate classification of only a relatively small portion of the cyclically moving catalyst stream, containing a substantially greater percentage of fines than said cyclically moving stream.

These and other objects of the invention will become apparent from the following description of the drawings attached hereto. Of these drawings, Figure 1 is an elevational view showing a typical apparatus arrangement adapted for the method of this invention and Figure 2 is an isometric detail of that portion of the apparatus in Figure 1 lying between lines 2—2 and 3—3.

Figure 3 is a detailed view, partially in section, of a portion of the apparatus shown in Figure 1, Figure 4 is a sectional plan view taken at line 4—4 of Figure 3, Figure 5 is a view, partially in section of a modified form of the apparatus shown in Figure 3, and Figures 6 and 7 show other modified arrangements of the apparatus. All of these drawings are highly diagrammatic in form.

Turning now to Figure 1, we find a convertor 10 provided with a reactant inlet 11 near its lower end, a reactant outlet 12 near its upper end, blanket gas inlets 13 and 14 at its upper and lower ends respectively, a solid drain conduit 15 bearing flow control valve 16 at its lower end and an elongated solid feed leg 17 connected into its upper end. A regenerated catalyst supply hopper 18 is provided at the upper end of the convertor feed leg. Also shown is a regenerator 19 provided with combustion gas inlet 20 within the lower section thereof, flue gas outlet 21 within the upper section thereof, heat exchange fluid inlet 22 and outlet 23 near the lower and upper ends thereof respectively, solid drain conduit 24 bearing flow control valve 25 at the lower end thereof and solid inlet conduit 32 at the upper end thereof. The heat exchange fluid inlet and outlet connect into tubes (not shown) distributed uniformly throughout the regeneration zone. It will be understood that the convertor and regenerator shown are intended merely as typical examples and that the invention is not limited to any particular type of regenerator or convertor so long as they are adapted to permit proper contacting between gas and a substantially compact column of downwardly moving catalyst particle. Thus, if desired, the convertor reactant inlet and outlet may be reversed so as to permit concurrent flow of catalyst and gaseous reactant. Moreover, the regenerator may be divided into a plurality of alternate burning and cooling stages, each burning stage being provided with gas inlet and outlet means. Between the convertor and regenerator are provided conveyors 26 and 27 which may be of any suitable type adapted to transport hot catalyst particles from the regenerator to the reactor supply hopper and from the reactor to the regenerator. A section may be provided within the upper end of the regenerator vessel to serve as a regeneration zone supply or surge chamber.

Positioned above the regenerator is an elutriator 28 having gas inlet 29 at its lower end and gas outlet 30 at its upper end. A drain section 31 connecting into the regenerator feed conduit 32 is provided at the lower end of the elutriator. A gas inlet 29 is connected into the section 31. A cyclone separator 33 is also located above the regenerator to separate fines from gas supplied thereto from elutriator 28 through conduits 30 and 34 and from the regenerator through conduits 35 and 34.

Studying now, Figures 1 and 2 together, an elongated, inclined, flat-bottomed chute 36 is provided between the discharge from conveyor 26 and the regenerated catalyst supply hopper 18. Near the lower end of chute are provided a series of slot type openings 37 in the bottom of chute 36. The openings communicate with drain section 38 which connects on its lower end to drain conduit 39 bearing a flow control valve 40. The drain conduit 39 in turn connects into conduit 41 which provides a passage for solid material flow to a location within the upper section of elutriator 28.

In operation heated gaseous hydrocarbons are introduced through conduit 11 into the convertor 10 wherein they contact the column of catalyst maintained at temperatures of the order of 800 to 950° F. Converted hydrocarbons are withdrawn through conduit 12 to separate fractionation and finishing apparatus (not shown). Inert gas such as steam or flue gas is admitted through conduits 13 and 14 to the upper and lower ends of the convertor respectively so as to prevent escape of reactant gas through the catalyst feed leg 17 and drain conduit 15. Hot spent catalyst bearing a carbonaceous contaminant deposited thereon during the hydrocarbon conversion is drained from the bottom of convertor 10 through conduit 15 at a predetermined rate controlled by valve 16. The spent catalyst is conducted by conveyor 27 to the upper end of the regenerator vessel into which it feeds via conduits 42 and 32. Within the regenerator the hot catalyst is contacted with a combustion supporting gas such as air introduced through conduit 20. Flue gas is withdrawn through conduit 21 from which it passes via conduits 35 and 34 into the separator 33, wherein any entrained fines are separated. The fines are withdrawn from separator 33 through drain 43 and the flue gas passes therefrom through conduit 44. The catalyst within the regenerator is maintained below a temperature which would cause permanent heat damage thereto by removal of heat released by contaminant combustion by means of a suitable heat exchange fluid introduced through conduit 22 into heat transfer tubes within the regenerator (not shown) and withdrawn through conduit 23. Generally the catalyst temperature within the regenerator is controlled within the approximate range 800 to 1200° F.

Regenerated catalyst passes from the lower end of regenerator 19 via conduit 24 and flow control valve 25 to conveyor 26. The regenerated catalyst is conducted by conveyor 26 to the upper end of inclined chute 36 through which it flows as a continuous stream into supply hopper 18. As the stream of cyclically moving catalyst passes downwardly through the chute 36 the fines accumulated therein due to attrition of particles of normal size range tend to concentrate along the underside of the stream. Catalyst containing the concentrated fines is withdrawn from the bottom of the catalyst stream through slotted openings 37 located in the bottom of chute 36 at a rate controlled by valve 40 in the drain conduit 39 amounting to only a minor fraction of the total rate of flow of the cyclically moving stream of catalyst. The withdrawn catalyst containing concentrated fines is passed through conduit 41 into the upper section of elutriator 28, through which it is permitted to rain downwardly countercurrently to a stream of flue gas introduced through conduit 29 at a rate sufficient to entrain the fines and thereby scrub the catalyst substantially free of fine particles. The flue gas carrying the fines scrubbed from the catalyst is passed from the upper section of elutriator 28 through conduit 30 to the cyclone separator 33 wherein the fines are separated from the gas. The scrubbed catalyst, substantially freed of fines is returned to the cyclically moving catalyst stream by permitting it to drop through elutriator drain section 31 into the regenerator feed conduit 32 wherein it joins the main stream of catalyst passing from conduit 42. In place of the elutriator other means for solid classification such as mechanically driven screens may be used to effect the separation of fines from the relatively small catalyst stream withdrawn from the main cyclically moving stream through conduit 39.

It has been found that there is a tendency for non-uniform downward solid flow across the horizontal cross-sectional area of the drain section 38 caused by the drain conduit 39 of much smaller cross-sectional area. This gives rise to a tendency for a higher rate of contact material withdrawal through the slotted openings 37 in chute 36 which are directly over the discharge conduit than from the other openings. As a result some contact material from strata in the stream moving through chute 36 somewhat above the lowermost strata tend to be withdrawn through those slotted openings where excessive rate of flow occurs. This means, of course, that the percentage fines in the contact material passing to drain section 38 is somewhat lower than would be the case if only contact material flowing in the lowermost stratum of the stream in chute 36 were withdrawn.

It has therefore been found desirable as a preferred form of this invention to provide baffling within the drain section 38 adapted to promote uniform downward flow of contact material in the drain section near its upper end. Turning now to Figure 3, there is shown one method for accomplishing such uniform flow. In Figure 3 there is shown in cross section a section of the chute 36, a drain section 38 connected to chute 36 below slotted openings 37 and a drain conduit 39 bearing flow control valve 40 connected to the lower end of drain section 38. A partition 45 is positioned across the lower section of drain section 38. A plurality of orifices having depending tubes 46 therein are distributed across the partition 45. These orifices should be in general uniformly distributed across the partition cross-sectional area, for example, as shown in the sectional view taken at line 4—4 of Figure 3 shown in Figure 4. It will be seen in Figure 4 that the orifices and tubes are arranged in a circular pattern symmetrically staggered with respect to the drain conduit 39 therebelow.

A somewhat modified arrangement is shown in Figure 5 wherein like members bear like numerals. In Figure 5 a lower partition 47 is provided having orifices and tubes 48 therein arranged in a circular row. Spaced above partition 47 is a second partition 49 having therein two concentric circular rows of orifices having depending tubes 50 and 51. The tubes 50 and 51 are horizontally staggered with respect to the orifices and tubes 48 so that there is proportionate solid flow from the two rows of tubes in partition 49 to the single row of tubes 48 in partition 47. This arrangement is better adapted for drain sections of very large cross-sectional area. The arrangement is such that the solid flow at the bottom of the column of contact material within the drain section is divided into a plurality of streams which are then proportionately merged to provide a single compact discharge stream. By provision of uniform orifice distribution in the uppermost partition, and the proportionate merging of the streams flowing from these orifices, uniform solid withdrawal from all the slotted openings 37 in chute 36 is insured.

It will be understood that in that level of the discharge chamber immediately over the uppermost partition there will be a zone of non-uniform solid flow. The height of this zone depends upon the angle of internal flow of the particular solid material involved. The angle of internal flow for granular contact material of the type used for catalytic conversion of hydrocarbons is generally of the order of 60 to 75 degrees. The height of the zone of non-uniform flow and the minimum distance which the uppermost partition should be located below the upper end of the discharge section may be approximately estimated by drawing converging lines upwardly from the edges of adjacent orifices at an angle of about 65 degrees with the horizontal. Above the level of convergence of these lines reasonably uniform solid flow may be expected. It will be understood that for drain sections of very large cross-sectional area more than two spaced partitions may be employed, the number of orifices in each partition upward progressively increasing.

While it has been found preferable to provide dependent tubes from the orifices in the partition having a length equal to at least twice their diameter, uniform flow control may also be accomplished by the provision of partitions with properly spaced orifices therein without any dependent tubes. In any case, it has been found desirable to so space the partitions that a line drawn downwardly from the orifice or tube outlet from one partition to an adjacent receiving orifice in the partition therebelow forms an angle with the horizontal greater than about 45 degrees. It has also been found desirable to provide orifices of progressively increasing diameter in each successive partition downward. In order to provide uniform flow of solid across the cross section of the upper end of the stream in the discharge conduit 39, it has been found important to locate the throttling valve 40 a distance below the upper end of said conduit 39 equal to at least twice the diameter of conduit 39.

While the arrangements of substantially equal holes in each partition positioned in circular rows is a preferred form of the invention it will be understood that other arrangements of orifices or slots may also be provided. Thus, for example, orifices may be arranged in parallel straight rows as shown in Figures 6 and 7. In Figure 6 are shown an uppermost partition having therein orifices 52 arranged in straight parallel rows and in Figure 7 are shown orifices 53 in the lower partition arranged in staggered relationship to the orifices 52 in the portion thereabove. It will also be understood that in its broadest scope the invention is not necessarily limited to the partition and orifice method for providing uniform flow control. Any suitable arrangement of baffling which will provide uniform solid withdrawal from the openings in the chute 36 may be used instead. By the provision of uniform downward solid flow in all sections of the upper end of the column or accumulation of contact material within the drain section, and by the insurance of continuity of column from the throttling valve in the discharge stream through the drain section to the cyclically moving stream passing through the inclined chute, uniform solid withdrawal from the entire withdrawal area along the underside of the cyclically moving stream may be insured. As a result, by proper control of the rate of solid withdrawal through drain conduit 39, only the contact material containing the concentration of fines flowing in the lowermost strata of the stream in chute 36 is withdrawn.

The length of inclined chute required to insure proper concentration of fines along the bottom thereof depends somewhat on the slope of the chute, increasing with increasing slope. Generally the chute should be positioned at an angle within the range 35 to 70 degrees with the horizontal and preferably 35 to 50 degrees with the horizontal. For chutes positioned at an angle within the range of 35 to 50 degrees with the horizontal, a chute length of the order of 3 to 6 feet has been found to be satisfactory. The chute should be preferably of such dimensions as to limit the depth of the material moving therethrough to about three inches.

Generally it has been found desirable to limit fine accumulation in the cyclically moving catalyst stream below about 5.0% by weight and preferably below about 2.0% by weight. Since the procedure of passing the cyclically moving stream of catalyst downwardly through an elongated flat chute causes concentration of fines in the underside of the catalyst stream, the percentage fines in the withdrawn material is considerably greater than in the main cyclically moving stream. In a typical operation wherein the cyclically moving catalyst stream was made up principally of particles falling within a predetermined normal size range of 4 to 8 mesh, the total rate of catalyst circulation was about 120 tons per hour. It was found desirable to limit the average percentage fines (i. e., material passing through 10 mesh by Tyler screen gauge) below about 3.0% by weight. The percentage fines in the cyclically moving stream supplied to the upper end of chute 36 was 3.0% by weight. The percentage fines in the material withdrawn from the bottom of chute 36 near the lower end thereof through conduit 39 was 34.5% by weight. The rate of catalyst withdrawal through conduit 39 was 3 tons per hour or 2.5% by weight of the total rate of flow of the cyclically moving catalyst stream. The withdrawn catalyst was passed through an elutriator wherein all but about 2.7% by weight fines was separated from the catalyst of normal size range.

It will be apparent from the above example that since the percentage fines in the withdrawn catalyst was about 11.5 times the percentage of fines in the cyclically moving stream of catalyst, the accumulation of fines in the cyclically moving stream was effectively limited to the desired level by the processing in the elutriator of less than $\frac{1}{10}$ of the amount of catalyst as it would have been necessary to process if a mere representative fraction of the cyclically moving catalyst stream were processed. Thus, by the method of this invention the required size of the classification equipment is materially reduced and the amount of extra handling of catalyst leading to further undesirable attrition is materially reduced.

It will be understood that the examples of apparatus construction, operation conditions and applications of this invention given hereinabove are merely exemplary in nature and are to be in no way construed as limiting the scope of this invention except as it may be limited by the following claims.

We claim:

1. In a hydrocarbon conversion process wherein particle form contact mass material is passed cyclically through a hydrocarbon conversion zone and a contact material regeneration zone through which zones it moves as a substantially compact column of solid particles, the method for removing fines resulting from attrition of the cyclically flowing contact material which method comprises the steps of passing the cyclically moving stream of contact material downwardly along an inclined, elongated chute so as to cause a concentration of the fines along the underside of said stream, withdrawing contact material containing some of the largest sized particles along with said concentration of fines from the bottom of said chute at a location near its lower end at a rate amounting to only a minor fraction of the total rate of contact material flow through said chute, effecting the separation of fines from said withdrawn contact material and returning contact material containing said largest sized particles substantially freed of fines to the cyclically moving stream of contact material while excluding the return of said separated fines.

2. In a continuous catalytic process for hydrocarbon conversion wherein a stream of particle form catalyst is passed cyclically through a regenerated catalyst supply zone, a conversion zone wherein it is contacted with gaseous hydrocarbons, a spent catalyst supply zone and a regeneration zone the method for removing fines caused by attrition from the cyclically moving stream of catalyst which method comprises: directing said stream of catalyst moving from said regeneration zone to said regenerated catalyst supply zone through an elongated, inclined chute so as to cause said fines to concentrate along the bottom of said stream passing through said chute, withdrawing catalyst containing some of the largest sized particles and said concentrated fines from the bottom of said stream near the lower end of said chute at a controlled rate amounting to only a minor fraction of the total rate of catalyst flow through said chute and passing the remaining major fraction of catalyst flow from the lower end of said chute into said regenerated catalyst supply hopper, raining said minor fraction of catalyst containing said largest sized particles and said concentrated fines downwardly through a substantially vertical confined scrubbing zone counter-currently to a stream of scrubbing gas passed upwardly through said scrubbing zone at a rate sufficient to scrub said fines from the catalyst and returning the scrubbed catalyst containing largest sized particles to said cyclically moving stream of catalyst while excluding the return of the separated fines to said cyclically moving stream.

3. In a hydrocarbon conversion process wherein a particle form catalyst of predetermined particle size range is passed cyclically through a conversion zone wherein it moves as a substantially compact column and is contacted with gaseous hydrocarbons to effect the conversion thereof and through a catalyst regeneration zone wherein it moves as a substantially compact column and is contacted with a combustion supporting gas to burn off carbonaceous contaminants deposited in said conversion zone, the method for removing fines accumulated in said cyclically moving stream of catalyst due to gradual attrition which method comprises: passing said stream at a point intermediate its passage from said regeneration zone to said conversion zone downwardly through an elongated inclined zone so as to cause said fines to settle to the bottom of said stream, withdrawing contact material containing the settled fines as well as some of the largest sized particles from the bottom of said stream near the lower end of said inclined zone at a controlled rate amounting to a minor fraction of the total rate of flow of said cyclically moving stream of contact material onto a substantially compact column of said contact material maintained below and contiguous the underside of said stream, withdrawing contact material from the lower section of said column at a controlled rate corresponding to the rate of contact material flow onto said column from said stream, effecting the separation of fines from said withdrawn contact material and combining the contact material substantially freed of fines with the contact material in said cyclically moving stream and rejecting the separated fines.

4. In a hydrocarbon conversion process wherein a particle form catalyst of predetermined particle size range is passed cyclically through a conversion zone wherein it moves as a substantially compact column and is contacted with gaseous hydrocarbons to effect the conversion thereof and through a catalyst regeneration zone wherein it moves as a substantially compact column and is contacted with a combustion supporting gas to burn off carbonaceous contaminants deposited in said conversion zone, the method for removing fines accumulated in said cyclically moving stream of catalyst due to gradual attrition which method comprises: passing said stream at a point intermediate its passage from said regeneration zone to said conversion zone downwardly through an elongated flat-bottomed chute, inclined at an angle within the range of about 35 to 50 degrees with the horizontal so as to cause the fines in said stream to concentrate on the underside thereof, withdrawing catalyst containing some of the largest sized particles along with said concentrated fines from the underside of said stream near the lower end of said chute from a plurality of spaced openings of greater size than the largest sized catalyst particles at a rate amounting to about 2 to 10 per cent by volume of the total rate of catalyst flow in said cyclically moving stream, separating fines from said withdrawn catalyst in a separate zone and returning the catalyst from which the fines have been separated to said cyclically moving stream of catalyst.

5. In a hydrocarbon conversion process wherein particle form contact mass material is passed cyclically through a hydrocarbon conversion zone and a contact material regeneration zone through which zones it moves as a substantially compact column of solid particles, the method for removing fines resulting from attrition of the cyclically flowing contact material which method comprises the steps of passing the cyclically moving stream of contact material downwardly along an inclined, confined passage so as to cause a concentration of the fines along the underside of said stream; maintaining in contact with the underside of said stream over a substantial area near the lower end of said confined passage, a substantially compact accumulation of contact material containing fines, said accumulation being in free contact material flow communication with the underside of said stream along said area of contact, withdrawing contact material from the bottom of said accumulation as a subdivided moving bed uniformly distributed over the cross-sectional area of the bottom of said accumulation, said subdivided bed having a cumulative cross-sectional area less than that of said accumulation, causing said subdivisions to converge at an angle with the vertical less than about 45 degrees, proportionately merging said subdivisions into a continuous moving substantially compact discharge stream of less cross-sectional area than said accumulation, controlling the flow of contact material in said discharge stream such as to provide substantially uniform solid flow across its cross-section at its upper end and at such a total rate as to limit the amount of fines flowing from the underside of said stream in said inclined passage into said accumulation to only a minor fraction of the total rate of contact material flow through said inclined passage, effecting the separation of fines from said contact material withdrawn in said discharge stream and returning contact material substantially freed of fines to the cyclically moving stream of contact material.

6. In a hydrocarbon conversion process wherein particle form contact mass material is passed cyclically through a hydrocarbon conversion zone and a contact material regeneration zone through which zones it moves as a substantially compact column of solid particles, the method for removing fines resulting from attrition of the cyclically flowing contact material which method comprises the steps of passing the cyclically moving stream of contact material downwardly along an inclined, confined passage so as to cause a concentration of the fines along the underside of said stream, withdrawing contact material containing said concentrated fines from the underside of said stream through a plurality of openings uniformly distributed over a substantial area of the underside of said confined passage onto a confined throttling accumulation of downwardly moving contact material maintained below and in contact with said stream through said withdrawal openings, interposing resistances to flow in said accumulation near its lower end proportioned to subdivide said accumulation of moving contact material uniformly across its horizontal cross-sectional area, without disrupting the continuity of said accumulation, proportionately merging said subdivisions to form a common substantially compact downwardly extending discharge stream of substantially less cross-sectional area than said accumulation while limiting the angle of convergence of said subdivisions below about 45 degrees with the vertical, throttling the flow of contact material in said discharge stream at a distance below its upper end equal to at least twice the diameter of said stream so as to provide substantially uniform contact material flow across its cross-sectional area at its upper end and such as to maintain continuity of solid column from said discharge stream through said accumulation to said cyclically moving stream, said throttling being such as to limit the amount of flow in said discharge stream to only a minor fraction of that in said cyclically moving stream, effecting the separation of fines from the contact material withdrawn in said discharge stream and passing the contact material substantially freed of fines to the cyclically moving stream of contact material.

7. In a hydrocarbon conversion process wherein particle form contact mass material is passed cyclically through a hydrocarbon conversion zone and a contact material regeneration zone through which zones it moves as a substantially compact column of solid particles, the method for removing fines resulting from attrition of the cyclically flowing contact material which method comprises the steps of passing the cyclically moving stream of contact material downwardly along an inclined, confined passage so as to cause a concentration of the fines along the underside of said stream, withdrawing contact material containing normal sized particles and a high percentage of fines from a substantial area of the underside of said stream near its lower end as a substantially compact column of downwardly moving particles, said column being contiguous at its upper end with the underside of said stream, baffling the particle flow in said column to provide uniform downward flow of particles across substantially its entire cross-sectional area at its upper end, withdrawing contact material containing fines from the lower end of said column at a rate amounting to only a minor fraction of the rate of flow in said cyclically moving stream, effecting the separation of fines from said withdrawn contact material and returning the normal sized particles of contact material substantially freed of fines to said cyclically moving stream while preventing the return of said separated fines to said cyclically moving stream.

8. In a hydrocarbon conversion process wherein particle form contact mass material is passed cyclically through a hydrocarbon conversion zone and a contact material regeneration zone through which zones it moves as a substantially compact column of solid particles, the method for removing fines resulting from attrition of the cyclically flowing contact material which method comprises the steps of passing the cyclically moving stream of contact material downwardly along an inclined, confined passage so as to cause concentration of the fines along the underside of said stream, withdrawing contact material containing said concentrated fines from a plurality of points distributed over a substantial area of the underside of said stream near its lower end onto a substantially compact column of downwardly moving contact material maintained below and contiguous the underside of said stream, removing contact material from said column in a plurality of streams from each of a plurality of locations distributed across the cross-sectional area of said column, each stream being created by combining several smaller streams withdrawn from points above and horizontally staggered with respect to said first named locations, recombining said first named plurality of streams to form a single discharge stream and controlling the rate of flow in said discharge streams to only a minor fraction of that of said cyclically moving stream, effecting the separation of fines from said contact material withdrawn in said discharge stream and returning contact material substantially freed of fines to said cyclically moving stream.

9. In a hydrocarbon conversion process wherein particle form contact mass material is passed cyclically through a hydrocarbon conversion zone and a contact material regeneration zone through which zones it moves as a substantially compact column of solid particles, the method for removing fines resulting from attrition of the cyclically flowing contact material which method comprises the steps of passing the cyclically moving stream of contact material in a downwardly sloping confined path of substantial horizontal width so as to cause a concentration of fines along the underside of said stream, maintaining a substantially compact bed below and contiguous with the underside of said stream at a location spaced a substantial distance below the upper end of said confined path but above the lower end thereof, withdrawing contact material containing some normal sized particles and a concentration of fines from the underside of said stream onto said contiguous bed at a controlled rate which is only a minor fraction of the total rate of flow of said stream by withdrawing contact material from the lower section of said bed at a controlled, corresponding rate, effecting the separation of fines from the normal sized particles in the contact material withdrawn from said bed and returning only the normal sized particles substantially freed of fines to the cyclically moving stream of contact material.

FRANK C. FAHNESTOCK.
WALTER ULLRICH.

REFERENCES CITED

The following references are of record in the file of this patent:

UNITED STATES PATENTS

| Number | Name | Date |
| --- | --- | --- |
| 1,030,653 | Dyer | June 25, 1912 |
| 2,290,580 | Degnen et al. II | July 21, 1942 |
| 2,325,611 | Keranen | Aug. 3, 1943 |
| 2,350,730 | Degnen et al. I | June 6, 1944 |
| 2,362,270 | Hemminger | Nov. 7, 1944 |
| 2,393,893 | Evans et al. | Jan. 29, 1946 |

Disclaimer 2,434,843.—*Frank C. Fahnestock*, Manhasset, and *Walter Ullrich*, Pleasantville, N. Y. METHOD FOR HYDROCARBON CONVERSION IN PRESENCE OF PARTICLE FORM CATALYSTS. Patent dated Jan. 20, 1948. Disclaimer filed Jan. 21, 1952, by the assignees, *Socony-Vacuum Oil Company, Incorporated*, owner of an undivided one-half interest, and *The Lumas Company*, owner of an undivided one-half interest.

Hereby enter this disclaimer to claims 1, 2, 3, 4, and 9, of said patent.
[*Official Gazette February 19, 1952.*]